(12) United States Patent
Tate (10) Patent No.: US 12,313,131 B2
(45) Date of Patent: May 27, 2025

(54) ELECTRIC PROPULSION SYSTEMS

(71) Applicant: Hamilton Sundstrand Corporation, Charlotte, NC (US)

(72) Inventor: David James Tate, Hemel Hempstead (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/239,379

(22) Filed: Aug. 29, 2023

(65) Prior Publication Data
US 2024/0068531 A1  Feb. 29, 2024

(30) Foreign Application Priority Data
Aug. 30, 2022 (EP) .................... 22193009

(51) Int. Cl.
| | | |
|---|---|---|
| *F16D 47/04* | (2006.01) | |
| *F16D 11/00* | (2006.01) | |
| *F16D 11/14* | (2006.01) | |
| *F16D 27/118* | (2006.01) | |
| *F16D 27/12* | (2006.01) | |
| *F16D 41/07* | (2006.01) | |

(52) U.S. Cl.
CPC .............. *F16D 47/04* (2013.01); *F16D 11/14* (2013.01); *F16D 27/118* (2013.01); *F16D 27/12* (2013.01); *F16D 41/07* (2013.01); *F16D 2011/002* (2013.01)

(58) Field of Classification Search
CPC .... F16D 47/04; F16D 11/14; F16D 2011/002; F16D 41/07; F16D 27/10; F16D 27/118; F16D 27/12
See application file for complete search history.

(56) References Cited

U.S. PATENT DOCUMENTS

| | | | |
|---|---|---|---|
| 4,694,943 A | 9/1987 | Petrak | |
| 5,852,932 A | 12/1998 | Matsumoto | |
| 11,173,781 B2 | 11/2021 | Mock et al. | |
| 11,396,903 B2 | 7/2022 | Wojcik et al. | |
| 2013/0334000 A1* | 12/2013 | Gerauer | F16D 27/108 |
| | | | 192/69.7 |

(Continued)

FOREIGN PATENT DOCUMENTS

| | | |
|---|---|---|
| CN | 2667237 Y | 12/2004 |
| DE | 102019218983 A1 | 6/2020 |
| FR | 3119800 A1 | 8/2022 |

OTHER PUBLICATIONS

Extended European Search Report for European Patent Application No. EP22193009.2, dated Mar. 9, 2023.

*Primary Examiner* — Richard M Lorence (57) ABSTRACT

A drive mechanism for an electric propulsion system includes an electric machine. The drive mechanism includes a drive shaft with a longitudinal axis, an engagement assembly, a disconnect mechanism, and an overrunning clutch. The engagement assembly includes a drive shaft engagement element and an electric machine engagement element. The drive shaft engagement element includes first and second shaft gear rings, and each shaft gear ring is supported on the drive shaft. Each shaft gear ring includes a plurality of gear teeth, which are circumferentially disposed around the drive shaft and extend radially outward from the drive shaft.

20 Claims, 5 Drawing Sheets

(56) References Cited

U.S. PATENT DOCUMENTS

| | | | |
|---|---|---|---|
| 2022/0136594 A1* | 5/2022 | Holmes | F16D 47/04 192/69.42 |
| 2024/0068530 A1* | 2/2024 | Tate | F16D 27/12 |

* cited by examiner

ELECTRIC PROPULSION SYSTEMS

CROSS-REFERENCE TO RELATED APPLICATIONS

This application claims priority and the benefit of European Patent Application No. 22193009.2, filed Aug. 30, 2023, the entire content of which is herein incorporated by reference.

BACKGROUND

This application relates to electric propulsion systems and in particular drive mechanisms including a disconnect for electric propulsion systems.

Electric propulsion systems often include an electric machine that functions as an electric motor when it converts electricity to mechanical power, and as a generator when converts mechanical power to electricity. When acting as an electric motor the electric machine introduces torque into a drive mechanism, and that torque is transferred to a propulsion means, for example one or more propellers of an aeroplane or one or more wheels of a wheeled vehicle, for example a car. When acting as a generator the electric machine receives torque from the drive mechanism, and that torque is converted into electricity. That electricity may be stored in an electricity storage device, for example a rechargeable battery, or used to power a an electrical system. Some electric machines include one or more permanent magnets.

It is known that to manage system safety requirements for electric propulsion systems, including those that include one or more permanent magnets, there is a need to be able to disconnect the electric machine from the drive mechanism to ensure that the electric machine can be stopped from rotating or being rotated. This is necessary to manage a number of fault conditions. It also allows damage to the electric machine to be minimised or avoided once a fault has developed.

In some electric propulsion system architectures, a plurality of electric machines may provide torque to or receive torque from a single drive mechanism. In such architectures there may be a need to be able to disconnect the electric machines from the drive mechanism as a whole, or to disconnect the electric machines singly to ensure that one or more of the electric machines can be stopped from rotating or being rotated as required.

SUMMARY

According to a first aspect of the present disclosure there is provided a drive mechanism for an electric propulsion system that comprises an electric machine. The drive mechanism comprises a drive shaft with a longitudinal axis A, an engagement means, a disconnect mechanism, and an overrunning clutch. The engagement means comprises a drive shaft engagement element and an electric machine engagement element.

The drive engagement element comprises a first and second shaft gear ring, and each shaft gear ring is supported on the drive shaft. Each shaft gear ring comprises a plurality of gear teeth which are circumferentially disposed around the drive shaft, and the gear teeth extend radially outward from the drive shaft. The gear teeth of the first shaft gear ring have an axial length L1, and the first and second shaft gear rings are axially spaced from each other along the drive shaft by a distance L2.

The electric machine engagement element comprises a first and second gear set; and the first and second gear sets each comprise a plurality of gear teeth which are configured to mesh with the gear teeth of the first and second shaft gear rings respectively. The gear teeth of the first gear set have an axial length L3, and the first and second gear sets are separated from each other by a length L4 in the axial direction. The length L1 is less than length L4, and length L3 is less than length L2. The disconnect mechanism is configured to reversibly move one of the drive shaft engagement element or a part thereof and the electric machine engagement element or a part thereof relative to the other of the engagement elements in an axial direction between a first position and a second position.

The first position is one in which the gear teeth of the first shaft gear ring are meshed with the gear teeth of the first gear set and the gear teeth of the second shaft gear ring are meshed with the gear teeth of the second gear set. The second position is one in which the gear teeth of the first shaft gear ring are axially between the first and second gear sets and the gear teeth of the first shaft gear ring are not meshed with the gear teeth of the first or second gear sets. The electric machine is coupled to the electric machine engagement element through the overrunning clutch.

For the purposes of the present disclosure an electric machine is to be understood to be an apparatus that is configured to function as an electric motor only, an apparatus that is configured to function as a generator only, or an apparatus configured to function as both an electric motor and a generator.

The meshing of the gear teeth for the first and second shaft gear rings with the gear teeth of the first and second gear sets respectively is such that rotation of one of the first and second shaft gear rings and the first and second gear sets transmits torque to the other of the first and second shaft gear rings and the first and second gear sets with the effect that the gear teeth of both of the first and second shaft gear rings follow a circumferential path around the axis A, and the gear teeth of the first and the second gear sets each follow a circumferential path around a first and second gear set axis respectively.

An overrunning clutch includes an inner and outer race and a plurality of elements between the inner and outer race. The inner and outer races are configured to be able to independently rotate around a common axis. Dependent on the relative directions of rotation, and/or relative angular velocities of the inner and outer races the plurality of elements are so configured that they will transmit torque from the driving race to the driven race, or allow one of the races to rotate without transmitting torque to the other.

Alternatively expressed, when the driving race is rotating in a first direction with the same angular velocity and in the same direction as the driven race the plurality of elements transmit torque from the driving race to the driven race, but if the driving race is traveling in the same direction as the driven race but at a smaller angular velocity, or in a different rotational direction the plurality of elements will not transmit torque between the races and one rave will freewheel relative to the other. Known configurations of overrunning clutches include sprag clutches, roller ramp clutches, wrap spring clutches, and wedge clutches. At least one overrunning clutch of the present disclosure may be one of a sprag clutch, a roller ramp clutch, a wrap spring clutch, or a wedge clutch.

The inclusion of an overrunning clutch in the drive mechanism of the present disclosure is advantageous because the it ensures that the propulsion system can be driven in one rotational direction only, and that if, for example it is desirable to stop providing electricity to the electrical machine the decrease of rotational velocity of the rotating part of the electrical machine to zero does not cause the electrical machine to slow the drive shaft down to zero rotational velocity. In some embodiments the axis A, the first gear set axis and the second gear set axis are the same axis or in common.

In some embodiments the axis A, the first gear set axis and the second gear set axis are parallel axes.

In some embodiments the axis A, the first gear set axis and the second gear set axis are not all parallel to each other or in common with each other.

An advantage of the drive mechanism of the present disclosure is that because L1 is smaller than L4, and L3 smaller than L2 the teeth of the first shaft gear ring can sit axially between the teeth of the first gear sets, and the teeth of the first gear sets can sit axially between the teeth of the shaft gear rings without any of the teeth engaging or meshing with each other.

In an embodiment of any of the above embodiments, the drive shaft engagement element of at least one engagement means comprises n(1) shaft gear rings, and n(2) gear sets, where n(1) is greater than two, and n(2) is greater than two.

In an embodiment of the above embodiment, n(1) equals n(2).

In an embodiment of any of the above embodiments when n(1) and n(2) are greater than two, the gear teeth of the each shaft gear ring have an axial length L1, and axially adjacent shaft gear rings are axially spaced from each other along the drive shaft by a distance L2, the gear teeth of each gear set have an axial length L3, and gear sets that are adjacent in the axial direction are each separated from each other by a length L4 in the axial direction.

In an embodiment of any of the above embodiments, length L1 is approximately equal to length L3.

In an embodiment of any of the above embodiments, length L2 is approximately equal to length L4.

The maximum torque transmission that can occur between the drive shaft engagement element and the electric machine engagement element is dependent on the area of contact between the teeth of the shaft gear rings and the teeth of the gear sets. In known drive mechanisms there is one shaft drive ring and one gear set and the way to increase the maximum torque transmission between the shaft gear ring and the gear set is to increase the axial length of both the teeth on the shaft gear ring and the teeth on the gear set. This increases the contact area between those teeth which has the effect of increasing the area of contact and as such the maximum torque that is transmissible. This also has the effect of increasing the axial movement between the shaft gear ring and the gear set that is required to disengage or de-mesh the shaft gear ring from the gear set.

It is an advantage of the drive mechanism of the present disclosure that the axial movement of the shaft gear rings relative to the gear sets that is required to disengage the shaft gear rings from the gear sets is the larger of distances L1 and L3 whilst the contact length, and thus contact area, between the teeth of the shaft gear rings and the teeth of the gear sets is the smaller of twice L1 and twice L3. In embodiments where L1 is equal to L3, the effect is that the axial movement to disengage the shaft gear ring and the gear set is half that of the known mechanism which has the same contact length/area of twice L1 between the teeth on the shaft gear ring and the teeth on the gear set (when all other dimensions of the compared drive mechanisms are equal).

A further advantage of the drive mechanism of the present disclosure is that when n(1) and n(2) are greater than two the required axial movement of the shaft gear rings relative to the gear sets to disengage the shaft gear rings from the gear sets remains the larger of distances L1 and L3 whilst the contact length between the teeth of the shaft gear rings and the teeth of the gear sets is the smaller of n(1)×L1 and n(2)×L3.

In an embodiment of any of the above embodiments, the first and second shaft gear rings are rigidly fixed to the drive shaft such that they cannot move along the drive shaft in an axle direction.

In an alternative embodiment of the above embodiment, the first and second shaft gear rings are attached to the drive shaft in such a fashion that they may move at least a predetermined distance along the shaft in an axle direction when impelled to do so by the disconnect mechanism.

In an embodiment of any of the above embodiments, the drive mechanism is for use with two or more electric machines. The drive mechanism comprises two or more engagement means, and each engagement means is associated with a single or common drive shaft. The engagement means are axially spaced along the drive shaft. Each electric machine is coupled to the electric machine engagement element of an engagement means through an independent overrunning clutch. This arrangement or architecture is advantageous because all of the electric machines can apply torque to the same, common, drive shaft. This minimises the number of components in the drive mechanism and increases the torque supplied to the propulsion system relative to a single electric machine.

In an embodiment of any of the above embodiments, each engagement means is substantially the same as or similar to the other engagement means.

In an embodiment of any of the above embodiments, at least one of the gear sets of at least one engagement means comprises a second gear ring.

In an embodiment of any of the above embodiments, each second gear ring is co-axial with the drive shaft, and the gear teeth of each second gear ring extend radially inwards. An advantage of such an arrangement is that the drive mechanism can be, as a result, compact in size.

In an embodiment of any of the above embodiments, the gear teeth of each shaft gear ring are male or external splines, and the gear teeth of each gear set are female or internal splines.

In an embodiment of any of the above embodiments, the electric machine engagement element of at least one engagement means further comprises a hollow shaft, and each gear set of the electric machine engagement element is supported on the hollow shaft. In such embodiments the hollow shaft has a central axis that is the same as Axis A of the drive shaft.

In an embodiment of any of the above embodiments, the drive shaft further comprises a first stop element, one of the electric machine engagement elements of one of the engagement means further comprises a second stop element, and the first and second stop elements are so configured and located that they abut when the drive shaft engagement element and the electric machine engagement element of that engagement means and or the shaft gear rings and the gear sets are in the second position relative to each other. This is advantageous because the first and second stop elements prevent the shaft gear rings moving relative to the gear sets (or the gear sets moving relative to the shaft gear rings) by a distance that would cause the teeth of the shaft gear rings to begin to mesh with the teeth of the gear sets adjacent to the gear set (or the teeth of the gear sets to begin to mesh with the teeth of the shaft gear rings) that they are intended to mesh with.

In an embodiment of any of the above embodiments, each of the first and second stop elements comprises a stop surface, the stop surfaces of the first and second stop elements abut, and one or both of the stop surfaces comprise or are coated with a low friction material. This is advantageous because it minimises the friction between the stop surfaces and, as a result, minimises the transmission of torque between those stop surfaces.

In an embodiment of any of the above embodiments, each engagement means comprises a disconnect mechanism, the disconnect mechanism of each engagement means causes at least part of the electric machine engagement element to move axially relative to the drive shaft engagement element of that engagement means. In some embodiments the disconnect mechanism of each engagement means operates independently of the disconnect mechanisms of each other engagement means. This has the advantage that individual electric machines may be disengaged from the drive shaft without having to disengage other electric machines from the drive shaft.

In an alternative embodiment of any of the above embodiments, the drive mechanism is so configured that operation of the disconnect mechanism causes the relative movement of one of the drive shaft engagement element and electric machine engagement element relative to the other of the drive shaft engagement element and electric machine engagement element for each engagement means.

In an embodiment of any of the above embodiments, at least one disconnect mechanism comprises an actuator.

In an embodiment of any of the above embodiments, at least one disconnect mechanism comprises a solenoid mechanism.

According to a second aspect of the present disclosure there is provided an aeroplane or wheeled vehicle comprising an electric propulsion system, in which the electric propulsion system comprises at least one electric machine and at least one drive mechanism according to the first aspect of the present disclosure.

BRIEF DESCRIPTION OF THE DRAWINGS

The present invention will be further described and explained by way of example with reference to the accompanying drawings in which.

DETAILED DESCRIPTION

In the following discussions of the accompanying drawings, where the same element is present in a more than one embodiment the same reference numeral is used for that element throughout. Where there are similar elements, similar reference numerals (the same numeral plus a multiple of 100) are used.

Figure 1:
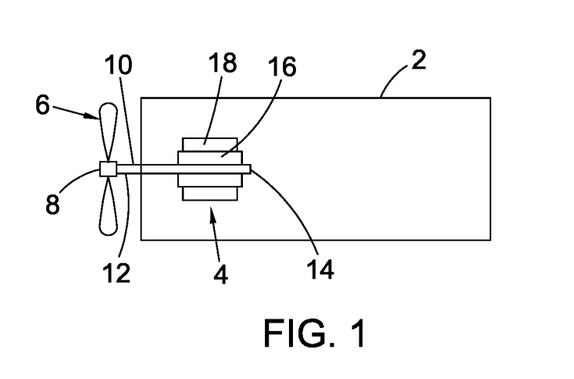
FIG. 1 shows a schematic view of a first embodiment of an aeroplane incorporating a first embodiment of a drive mechanism according to the present disclosure.

With reference to FIG. 1, an aeroplane 2 includes a propulsion system 4. The propulsion system 4 includes a propeller 6 which has a hub 8. The hub 8 is connected to a first end 12 of a drive shaft 10. Between the first end 12 and a second end 14 of the drive shaft 10 an electric machine 18 is engaged with the drive shaft 10 via a drive mechanism 16.

Figure 2:
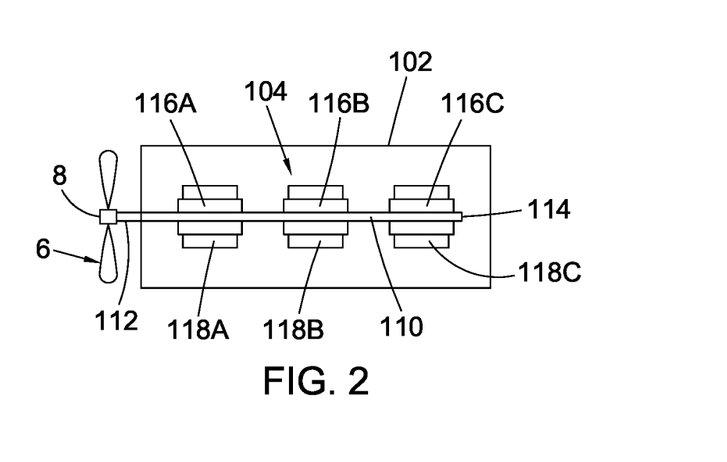
FIG. 2 shows a schematic view of a second embodiment of an aeroplane incorporating a second embodiment of a drive mechanism according to the present disclosure.

With reference to FIG. 2, an aeroplane 102 includes a propulsion system 104. The propulsion system 104 includes a propeller 6 which has a hub 8. The hub 8 is connected to a first end 112 of a drive shaft 110. Between the first end 112 and a second end 114 of the drive shaft 110 three electric machines 118A, 118B, 118C are each engaged with the drive shaft 110 via a drive mechanism 116A, 116B, 116C respectively. In the illustrated embodiment in FIG. 2 each electric machine 118A, 118B, 118C has the same configuration as electric machine 18 shown in FIG. 1.

Figure 3:
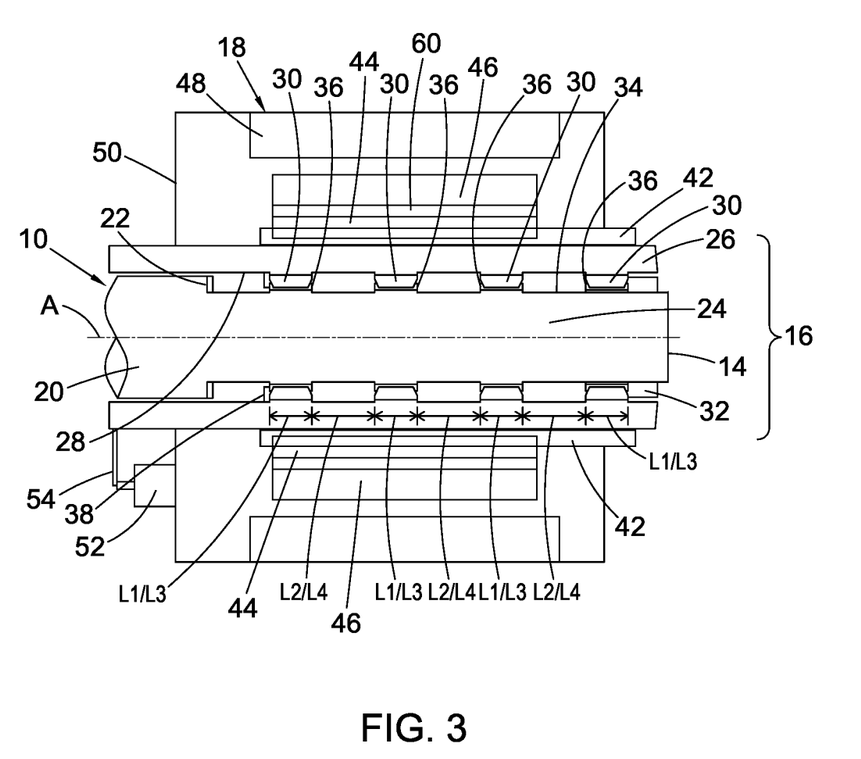
FIG. 3 shows a first schematic view of the drive mechanism of FIG. 1.
Figure 4:
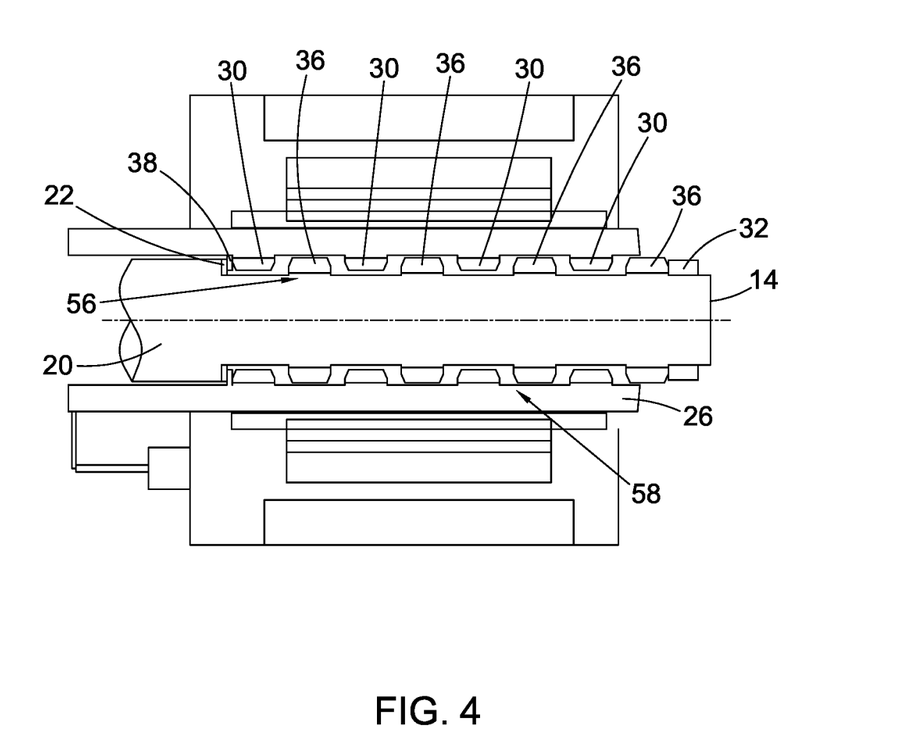
FIG. 4 shows a second schematic view of the drive mechanism of FIG. 1.

With reference to FIGS. 3 and 4, and with continued reference to FIG. 1, the drive shaft 10 has a longitudinal axis A and is comprised of a first portion 20 that extends from the first end 12 to a radially inwardly extending shoulder or stop element 22, and a second portion 24 which extends from the shoulder 22 to the second end 14. Adjacent the second end 14 a stop ring 32 extends circumferentially around and radially outward from the radially outer surface 34 of the drive shaft 10.

Located on the radially outer surface 34 of the second portion 24 of the drive shaft 10 is a drive engagement element 56 which is comprised of four gear rings. Each of the gear rings has the form of a male or external set of splines 36. The splines 36 are spaced circumferentially around the outer surface 34 and extend radially outwardly. Each of the splines 36 has an axial length L1 in the direction of axis A. The splines 36/each gear ring are axially spaced from the axially adjacent splines 36/gear ring(s) by a distance L2. In other non-illustrated examples of the drive mechanism of the present disclosure a different number of gear rings may be present. That different number may be two, three, or more than four. The number of gear rings/splines included in the drive engagement element may be determined by the desired maximum torque transmission between the drive shaft and the electric machine.

The splines 36 of the gear ring that is axially closest to the second end 14 of the drive shaft 10 are located on the gear shaft 10 so that the end of the splines 36 closest to end 14 abut the stop ring 32.

The drive mechanism 16 includes a hollow shaft 26 which is co-axial with the drive shaft 10. The drive shaft 10 extends through the hollow shaft 26, and the second portion 24 of the drive shaft 10 is substantially surrounded by the hollow shaft 26 together with the shoulder 22 and a part of the first portion 20 of the drive shaft 10 which is adjacent to the shoulder 22. The surrounded parts of the drive shaft 10 are to be considered to be part of the drive mechanism 16 for the purposes of the present disclosure.

The hollow shaft 26 has a radially outwardly facing surface 40 and a radially inwardly facing surface 28. Located on the radially inwardly facing surface 28 of the hollow shaft 26 is an electric machine engagement element 58. The electric machine engagement element 58 includes four gear sets. Each of the gear sets has the form of an female or internal set of splines 30. The splines 30 are spaced circumferentially around the inner surface 28 and extend radially inwardly. Each of the splines 30 has an axial length L3 in the direction of axis A. The splines 30 of each gear set are axially spaced from the splines 30 of the adjacent gear set(s) by a distance L4. In other non-illustrated examples of the drive mechanism of the present disclosure a different number of gear sets may be present. That different number may be two, three, or more than four.

In the embodiment illustrated in FIGS. 3 and 4, lengths L1 and L3 are same as each other as are distance L2 and L4.

Adjacent to the of the splines 30 of the gear set furthest from the second end 14 of the drive shaft 10 end furthest from the second end 14 of the drive shaft 10 is a stop element or stop block 38. The face of the stop element 38 furthest from the end 14 of the drive shaft 10 is coated with a low friction material.

The electric machine 18 includes a casing 50 within which a stator 48 is fixed and an armature 46 is supported on two or more bearings (not shown). The armature 46 is caused to rotate when electrical power is supplied to the electric machine 18. The armature 46 is coupled to an overrun clutch 60. In the illustrated example of the overrun clutch 60 shown in FIG. 6, the overrun clutch 60 is a sprag clutch.

Figure 6:
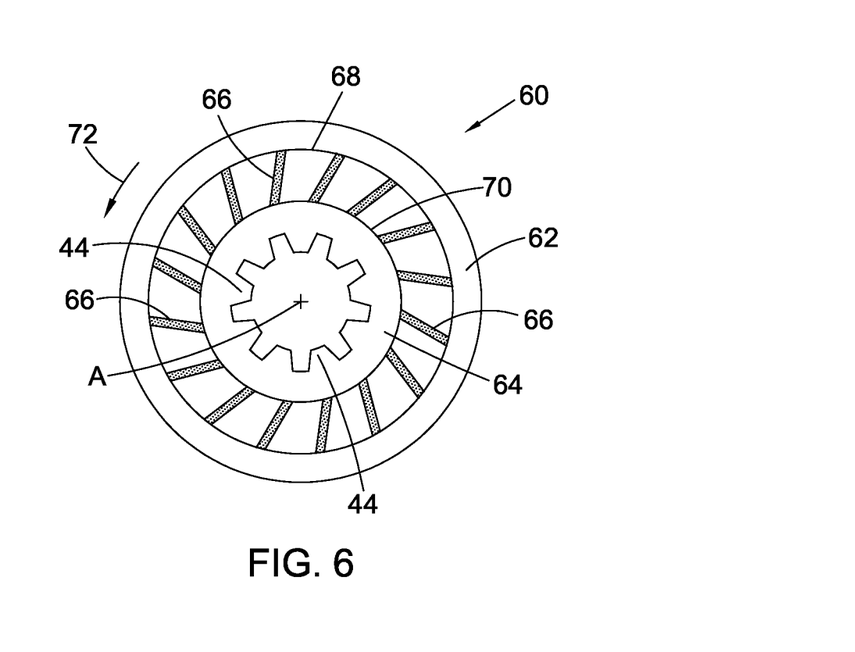
FIG. 6 shows a schematic sectional view of an embodiment of an over running clutch.

The overrun clutch 60 includes an outer race 62, an inner race 64, and a plurality of sprags 66 (for clarity, not all the sprags 66 are labelled). The outer and inner races 62, 64 are cylindrical with each having a longitudinal central axis that is the same as central axis A of the drive shaft 10. The sprags 66 extend between the radially inner surface 68 of the outer race 62 and the radially outer surface 70 of the inner race 64. The sprags 66 are so restrained that rotation of the outer race 62 in direction 72 at an angular velocity greater than the angular velocity of the inner race 64 moving in direction 72 causes the sprags 66 to jam between the surfaces 68, 70 and torque to be transmitted from outer race 62 to the inner race 64. Movement of the outer race 62 in direction 72 at an angular velocity less than the angular velocity of the inner race 64 moving in direction 72, or in the opposite direction to direction 72, causes the sprags 66 not to jam between the surfaces 68, 70 and no torque to be transmitted from outer race 62 to the inner race 64.

The radially inner surface of the inner race 64 is configured as a set of female or internal drive splines 44. The set of female drive splines 44 is adapted to follow a circumferential path around the axis A.

Located on the radially outward facing surface 40 of the hollow shaft 26 are a set of male or external drive splines 42. The hollow shaft 26 is so configured that the male drive splines 42 mesh with the set of female drive splines 44.

Supported on the case 50 of the electric machine 18 is a disconnect mechanism in the form of a solenoid 52. The solenoid 52 is coupled to the hollow shaft 26 via a coupling 54. The engagement of the coupling 54 to the hollow shaft 26 is such that the coupling remains engaged to the hollow shaft 26 when the hollow shaft 26 is rotating around the axis A.

Actuation of the solenoid 52 causes the hollow shaft 26 to be moved between a first position shown in FIG. 3 (in which the gear sets/splines 30 on the hollow cylinder 26 and the gear rings/splines 36 on the drive shaft 10 are fully engaged or meshed with each other), and a second position shown in FIG. 4 (in which the gear sets/splines 30 on the hollow cylinder 26 and the gear rings/splines 36 on the drive shaft 10 are not engaged or meshed with each other).

When the hollow cylinder 26 is in the first position the splines 30 closest to the end 14 of the drive shaft 10 abut the stop ring 32, and the hollow cylinder 26 is thus prevented from traveling any further toward or past the end 14 of the drive shaft 10.

When the hollow cylinder 26 is in the second position the stop element 38 abuts the shoulder or stop element 22 and prevents the hollow cylinder 26 moving too far away from the second end 14 of the drive shaft 10 and the splines 30 and 36 reengaging with each other.

The configuration of the set of female drive splines 44 and set of male drive splines 42 is such that those drive splines 42, 44 remain meshed or engaged with other throughout the movement of the hollow shaft 26 between the first and second positions.

With further reference to FIG. 2, in a first embodiment of the aeroplane 102, each of the drive mechanisms 116A, 116B, 116C are configured in the same fashion as drive mechanism 16 described above in connection with FIGS. 3, 4 and 6. In particular, the hollow shafts 26 of drive mechanism 116A, 116B, 116C are separate from each other and each of the actuators 52 of drive mechanisms 116A, 116B, 116C are independently controllable by suitable control means (not shown). As a result, each of electric machines 118A, 118B, 118C can be engaged with or disengaged from the drive shaft 110 independently of the other electric machines. Thus the propeller 6 can be driven by or drive one, two or three of the electric machines 118A, 118B, 118C.

Figure 5:
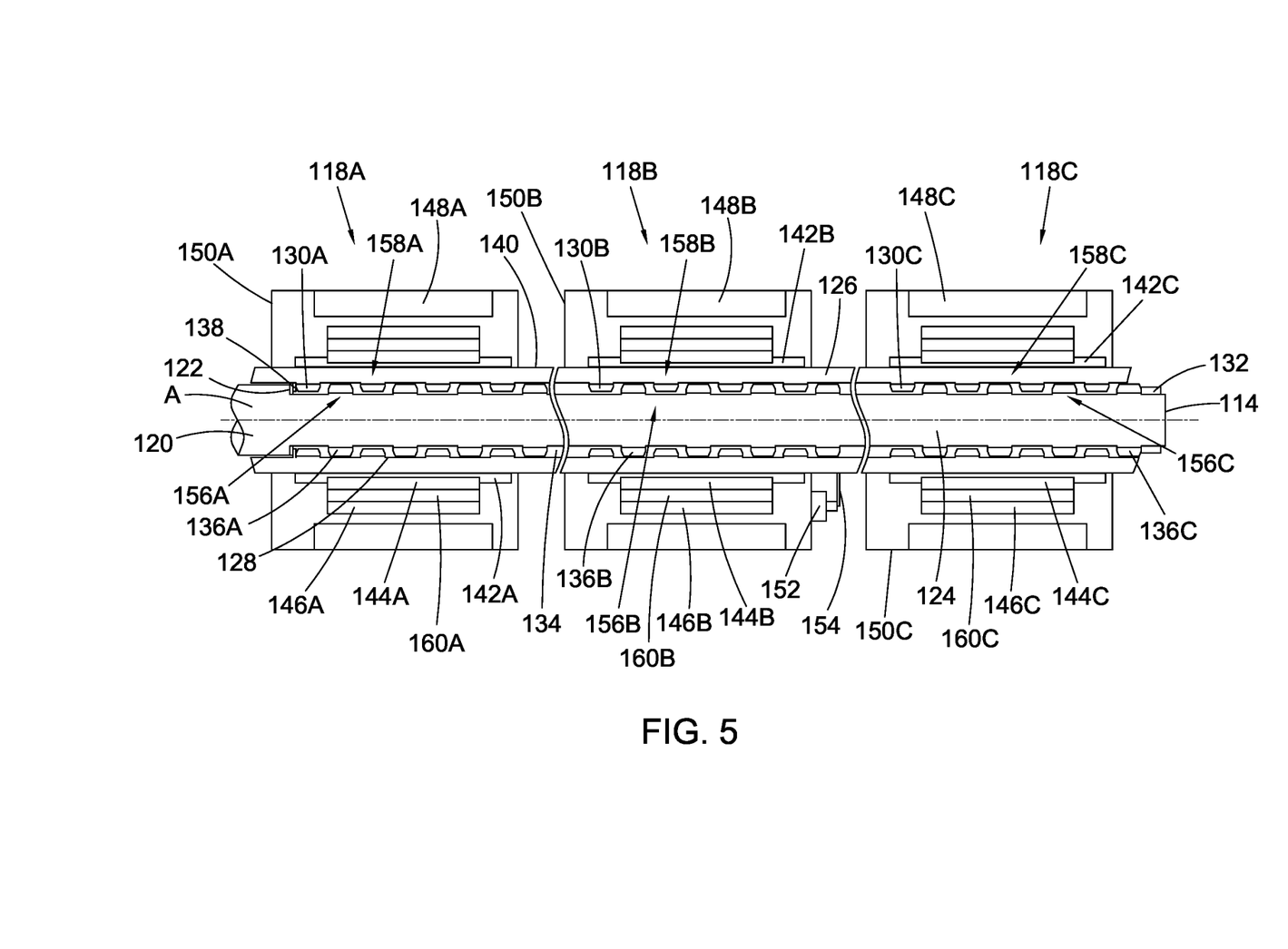
FIG. 5 shows a schematic view of an embodiment of the drive mechanism of FIG. 2.

With reference to FIG. 5 and with further reference to FIG. 2, in a second embodiment of the aeroplane 102 the drive shaft 110 has a longitudinal axis A and is comprised of a first portion 120 that extends from the first end 112 to a radially inwardly extending shoulder or stop element 122, and a second portion 124 which extends from the shoulder 122 to the second end 114. Adjacent the second end 114 a stop ring 132 extends circumferentially around and radially outward from the radially outer surface 134 of the drive shaft 110.

Located on the radially outer surface 134 of the second portion 124 of the drive shaft 110 are three drive engagement elements 156A, 156B, 156C which are axially spaced along the second portion 124 of the drive shaft 110. Each of the drive engagement elements 156A, 156B, 156C is comprised of four gear rings. The gear rings each have the form of a set of male or external splines 136A, 136B, 136C respectively (for clarity not all of not all of splines 136A, 136B, 136C are labelled). The splines 136A, 136B, 136C are spaced circumferentially around the outer surface 134 and extend radially outwardly. Each of the splines 136A, 136B, 136C has an axial length L1 in the direction of axis A. Within each drive engagement element 156A, 1568, 156C the splines 136A, 136B, 136C/each gear ring are axially spaced from the axially adjacent splines 136A, 136B, 136C/gear ring(s) by a distance L2. In other non-illustrated examples of the drive mechanism of the present disclosure a different number of gear rings in each drive engagement element may be present. That different number may be two, three, or more than four. There may be different numbers of gear rings in one or more of the drive engagement elements. The number of gear rings/splines included in each drive engagement element may be determined by the desired maximum torque transmission between the drive shaft and the electric machine with which the drive engagement element is associated.

The splines 136 of the gear ring that is axially closest to the second end 114 of the drive shaft 110 are located on the gear shaft 110 so that the end of the splines 136C closest to end 114 abut the stop ring 132.

The drive mechanisms 116A, 116B, 116C share a common hollow shaft 126 which is co-axial with the drive shaft 110. The drive shaft 110 extends through the hollow shaft 126, and the second portion 124 of the drive shaft 110 is substantially surrounded by the hollow shaft 126 together with the shoulder 122 and a part of the first portion 120 of the drive shaft 110 which is adjacent to the shoulder 122. The surrounded parts of the drive shaft 110 are to be considered to be part of the drive mechanisms 116A, 116B, 116C for the purposes of the present disclosure.

The hollow shaft 126 has a radially outwardly facing surface 140 and a radially inwardly facing surface 128. Located on the radially inwardly facing surface 128 of the hollow shaft 126 are three electric machine engagement elements 158A, 158B, 158C. The electric machine engagement elements 158A, 158B, 158C each include four gear sets. Each of the gear sets has the form of an female or internal set of splines 130A, 130B, 130C respectively (for clarity not all of not all of splines 130A, 130B, 130C are labelled). The splines 130A, 130B, 130C are spaced circumferentially around the inner surface 128 and extend radially inwardly. Each of the splines 130A, 130B, 130C has an axial length L3 in the direction of axis A. The splines 130A, 130B, 130C/each gear set are axially spaced from the axially adjacent splines 30/gear set(s) by a distance L4. In other non-illustrated examples of the drive mechanism of the present disclosure a different number of gear sets may be present. That different number may be two, three, or more than four. There may be different numbers of gear sets in one or more of the electric machine engagement elements. The number of gear sets/splines included in each electric machine engagement element may be determined by the desired maximum torque transmission between the drive shaft and the electric machine with which the electric machine engagement element is associated.

In the embodiment illustrated in FIG. 5, lengths L1 and L3 are same as each other as are distance L2 and L4.

Adjacent to the of the splines 130A of the gear set furthest from the second end 114 of the drive shaft 110 end furthest from the second end 114 of the drive shaft 110 is a stop element or stop block 138. The face of the stop element 138 furthest from the end 114 of the drive shaft 110 is coated with a low friction material.

Each of the electric machines 118A, 118B, 118C includes a casing 150A, 150B, 150C within which a stator 148A, 148B, 148C is fixed and an armature 146A, 146B, 146C is supported on two or more bearings (not shown). The armatures 146A, 146B, 146C are caused to rotate when electrical power is supplied to the electric machines 118A, 118B, 118C. Each of the armatures 146A, 146B, 146C are coupled to an overrun clutch 160A, 160B, 160C respectively. The over run clutches 160A, 160B, 160C are the same as overrun clutch 60 in the illustrated example of the overrun clutch 60 shown in FIG. 6 and as described above. The overrun clutch 60 is a sprag clutch.

The radially inner surface of the inner race 64 of each of overrun clutches 160A, 160B, 160C is configured as a set of female or internal drive splines 144A, 144B, 144C respectively. The electric machines 118A, 118B, 118C are so configured that the set of female drive splines 144A, 144B, 144C are each adapted to follow a circumferential path around the axis A.

Located on the radially outward facing surface 140 of the hollow shaft 126 are three sets of male or external drive splines 142A, 142B, 142C. The hollow shaft 126 is so configured that the male drive splines 142A, 142B, 142C mesh with the female drive splines 144A, 144B, 144C coupled to the armature 146A, 146B, 146C respectively.

Supported on the case 150B of the electric machine 118B is a disconnect mechanism in the form of a solenoid 152. The solenoid 152 is coupled to the hollow shaft 126 via a coupling 154. The engagement of the coupling 154 to the hollow shaft 126 is such that the coupling remains engaged to the hollow shaft 126 when the hollow shaft 126 is rotating around the axis A.

Actuation of the solenoid 152 causes the hollow shaft 126 to be moved between a first position in which the gear sets/splines 130A, 130B, 130C on the hollow cylinder 126 and the gear rings/splines 136A, 136B, 136C on the drive shaft 110 are fully engaged or meshed with each other, and a second position shown in FIG. 5 (in which the gear sets/splines 130A, 130B, 130C on the hollow cylinder 126 and the gear rings/splines 136A, 136B, 136C on the drive shaft 110 are not engaged or meshed with each other).

When the hollow cylinder 126 is in the first position the splines 130C closest to the end 114 of the drive shaft 110 abut the stop ring 132, and the hollow cylinder 126 is thus prevented from traveling any further toward or past the end 114 of the drive shaft 110.

When the hollow cylinder 126 is in the second position the stop element 138 abuts the shoulder or stop element 122 and prevents the hollow cylinder 126 moving too far away from the second end 114 of the drive shaft 110 and the splines 130A, 130B, 130C and 136A, 136B, 136C reengaging with each other.

The configuration of the set of female drive splines 144A, 144B, 144C and set of male drive splines 142A, 142B, 142C is such that those drive splines 142A, 142B, 142C, 144A, 144B, 144C remain meshed or engaged with other throughout the movement of the hollow shaft 126 between the first and second positions.

The above description is meant to be exemplary only, and one skilled in the art will recognize that changes may be made to the embodiments described without departing from the scope of the disclosure. Still other modifications which fall within the scope of the present disclosure will be apparent to those skilled in the art, in light of a review of this disclosure.

Various aspects of the drive mechanisms disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A system for use with an electric propulsion system that comprises an electric machine, wherein the system comprises:
   a drive shaft with a longitudinal axis in an axial direction; and
   a drive mechanism comprising:
      an engagement assembly comprising:
         a drive shaft engagement element comprising a first shaft gear ring and a second shaft gear ring, each of the first and second shaft gear rings supported on the drive shaft and comprising a plurality of gear teeth circumferentially disposed and extending radially outward from the drive shaft; and an electric machine engagement element comprising a first gear set and a second gear set, each of the first and second gear sets comprising a plurality of gear teeth configured to mesh with the gear teeth of the first shaft gear ring and the second shaft gear ring, respectively;

a disconnect mechanism configured to reversibly move the drive shaft engagement element in the axial direction between a first position and a second position; and an overrunning clutch configured to couple the electric machine engagement element to the electric machine;

wherein the gear teeth of the first shaft gear ring have a first axial length;

wherein the first and second shaft gear rings are axially spaced from each other along the drive shaft by a second axial length;

wherein the gear teeth of the first gear set have a third axial length;

wherein the first and second gear sets are separated from each other by a fourth axial length in the axial direction of the drive shaft, the first axial length is less than the fourth axial length, and the third axial length is less than the second axial length;

wherein, in the first position, the gear teeth of the first shaft gear ring are meshed with the gear teeth of the first gear set and the gear teeth of the second shaft gear ring are meshed with the gear teeth of the second gear set; and wherein, in the second position, the gear teeth of the first shaft gear ring are axially positioned between the first and second gear sets and are not meshed with the gear teeth of the first gear set or the second gear set.

2. The system according to claim 1, wherein:
the system comprises two or more electric machines and two or more drive mechanisms;
each drive mechanism comprises an engagement assembly axially spaced along the drive shaft, each of the engagement assemblies associated with the drive shaft; and
each drive mechanism comprises an overrunning clutch, each of the two or more electric machines coupled to an electric machine engagement element of a respective one of the engagement assemblies through a respective overrunning clutch.

3. The system according to claim 2, wherein the engagement assemblies are substantially identical.

4. The system according to claim 2, wherein the disconnect mechanism of each engagement assembly is configured to operate independently of the disconnect mechanisms of the other engagement assemblies.

5. The system according to claim 1, wherein the first axial length is approximately equal to the third axial length.

6. The system according to claim 1, wherein the drive shaft engagement element of the engagement assembly comprises at least three shaft gear rings and at least three gear sets.

7. The system according to claim 1, wherein:
the gear teeth of each of the first shaft gear ring and the second shaft gear ring are male splines, and
the gear teeth of each of the first gear set and the second gear set are female splines.

8. The system according to claim 1, wherein:
the electric machine engagement element further comprises a hollow shaft, and
each of the first gear set and the second gear set of the electric machine engagement element is supported on the hollow shaft.

9. The system according to claim 1, wherein:
the drive shaft further comprises a first stop element,
the electric machine engagement element further comprises a second stop element, and
the first stop element is configured to abut the second stop element when the drive shaft engagement element and the electric machine engagement element are in the second position.

10. The system according to claim 9, wherein:
each of the first stop element and the second stop element comprises a stop surface,
the stop surfaces of the first stop element and the second stop element abut, and
at least one of the stop surfaces comprises or is coated with a low friction material.

11. The system according to claim 9, wherein the disconnect mechanism is configured to operate independently of one or more disconnect mechanisms of one or more other engagement assemblies.

12. The system according to claim 1, wherein the disconnect mechanism comprises an actuator.

13. The system according to claim 12, wherein the actuator is a solenoid mechanism.

14. The system according to claim 1, wherein the overrunning clutch is a sprag clutch.

15. An aeroplane or wheeled vehicle comprising an electric propulsion system, wherein the electric propulsion system comprises:
an electric machine;
a drive shaft with a longitudinal axis in an axial direction; and
a drive mechanism comprising:
an engagement assembly comprising:
a drive shaft engagement element comprising a first shaft gear ring and a second shaft gear ring, each of the first and second shaft gear rings supported on the drive shaft and comprising a plurality of gear teeth circumferentially disposed and extending radially outward from the drive shaft; and
an electric machine engagement element comprising a first gear set and a second gear set, each of the first and second gear sets comprising a plurality of gear teeth configured to mesh with the gear teeth of the first shaft gear ring and the second shaft gear ring, respectively;
a disconnect mechanism configured to reversibly move the drive shaft engagement element in the axial direction between a first position and a second position; and
an overrunning clutch configured to couple the electric machine engagement element to the electric machine;
wherein the gear teeth of the first shaft gear ring have a first axial length;
wherein the first and second shaft gear rings are axially spaced from each other along the drive shaft by a second axial length;
wherein the gear teeth of the first gear set have a third axial length;
wherein the first and second gear sets are separated from each other by a fourth axial length in the axial direction of the drive shaft, the first axial length is less than the fourth axial length, and the third axial length is less than the second axial length;

wherein, in the first position, the gear teeth of the first shaft gear ring are meshed with the gear teeth of the first gear set and the gear teeth of the second shaft gear ring are meshed with the gear teeth of the second gear set; and wherein, in the second position, the gear teeth of the first shaft gear ring are axially positioned between the first and second gear sets and are not meshed with the gear teeth of the first gear set or the second gear set.

16. The aeroplane or wheeled vehicle according to claim 15, wherein:
the electric propulsion system comprises two or more electric machines and two or more drive mechanisms;
each drive mechanism comprises an engagement assembly axially spaced along the drive shaft, each of the engagement assemblies associated with the drive shaft; and
each drive mechanism comprises an overrunning clutch, each of the two or more electric machines coupled to an electric machine engagement element of a respective one of the engagement assemblies through a respective overrunning clutch.

17. The aeroplane or wheeled vehicle according to claim 16, wherein the engagement assemblies are substantially identical.

18. The aeroplane or wheeled vehicle according to claim 15, wherein the first axial length is approximately equal to the third axial length.

19. The aeroplane or wheeled vehicle according to claim 15, wherein the drive shaft engagement element of the engagement assembly comprises at least three shaft gear rings and at least three gear sets.

20. A drive mechanism for an electric propulsion system that comprises an electric machine, wherein the drive mechanism comprises:
a drive shaft with a longitudinal axis in an axial direction;
an engagement assembly comprising:
a drive shaft engagement element; and
an electric machine engagement element;
a disconnect mechanism configured to reversibly move the drive shaft engagement element in the axial direction between a first position and a second position; and
an overrunning clutch configured to couple the electric machine engagement element to the electric machine;
wherein, in the first position, the drive shaft engagement element and electric machine engagement element are engaged with each other; and
wherein, in the second position, the drive shaft engagement element and the electric machine engagement element are not engaged with each other.

* * * * *